United States Patent
Poon

[19]

[11] Patent Number: 6,101,383
[45] Date of Patent: Aug. 8, 2000

[54] APPARATUS AND METHOD IN A COMMUNICATION NETWORK

[75] Inventor: Kar-Fat Poon, Vellinge, Sweden

[73] Assignee: Telefonaktiebolaget LM Ericsson, Stockholm, Sweden

[21] Appl. No.: 08/993,782

[22] Filed: Dec. 18, 1997

[30] Foreign Application Priority Data

Dec. 19, 1996 [SE] Sweden .................................. 9604683

[51] Int. Cl.$^7$ ............................... H04Q 7/20; H04Q 7/38
[52] U.S. Cl. ......................... 455/425; 455/434; 455/515; 455/432; 455/509; 455/513; 455/450; 455/445
[58] Field of Search ..................................... 455/425, 422, 455/450, 445, 424, 451, 452, 509, 226.1, 226.2, 444, 441, 428, 434, 515, 432, 519

[56] References Cited

U.S. PATENT DOCUMENTS

| | | | |
|---|---|---|---|
| 5,305,468 | 4/1994 | Bruckert et al. | 29/428 |
| 5,379,446 | 1/1995 | Murase | 455/444 |
| 5,491,834 | 2/1996 | Chia | 455/441 |
| 5,608,780 | 3/1997 | Gerszberg et al. | 455/513 |
| 5,655,002 | 8/1997 | Proctor et al. | 455/513 |
| 5,768,267 | 6/1998 | Raith et al. | 455/422 |

FOREIGN PATENT DOCUMENTS

| | | |
|---|---|---|
| 0 625 863 A2 | 11/1994 | European Pat. Off. . |
| 9602459 | 2/1998 | Sweden . |
| 2225196A | 5/1990 | United Kingdom . |
| WO 96/26621 | 8/1996 | WIPO . |

OTHER PUBLICATIONS

GSM Recommendation 05.01, "Physical Layer on the Radio Path: General Description"; ETSI/GSM, Version 3.3.1, Jan. 1990, 11 pages.

GSM Recommendation 05.02, "Multiplexing and Multiple Access on the Radio Path", ETSI/TC GSM, Previous Released Version 3.4.1, New Released Version 3.5.0, Jan. 1991, 36 pages.

*Primary Examiner*—Fan Tsang
*Assistant Examiner*—Keith Ferguson
*Attorney, Agent, or Firm*—Burns, Doane, Swecker & Mathis, L.L.P.

[57] ABSTRACT

The present invention relates to a method and a mobile station for use in a communications network of GSM type, or a type derived from GSM. According to the invention the identification (307) of an unidentified BCCH carrier is initiated in the mobile station when said BCCH carrier on the basis of measured signal strengths is foreseen (321) soon to be one of the strongest BCCH carriers with regard to the signal strength average value over a measuring period. The delay from the point in time when the BCCH carriers becomes one of the strongest BCCH carriers, taking into account the signal strength average values over a measuring period, to the point when the BCCH carrier has been identified can in many cases be reduced or in some cases eliminated. Thus the mobile station can report measurement data for the BCCH carrier to the network at an earlier stage so that handover to the corresponding cell may be made faster.

17 Claims, 11 Drawing Sheets

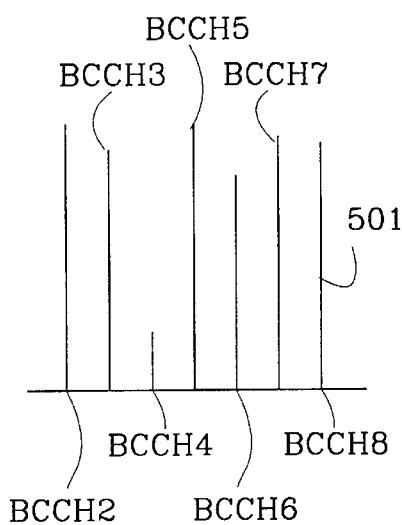
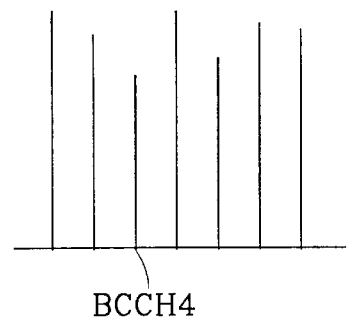
Fig. 5A          Fig. 5B
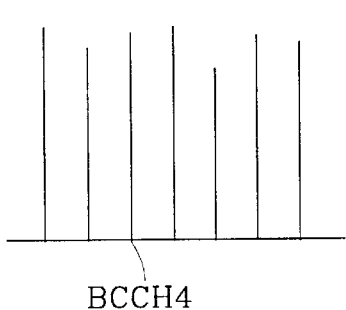
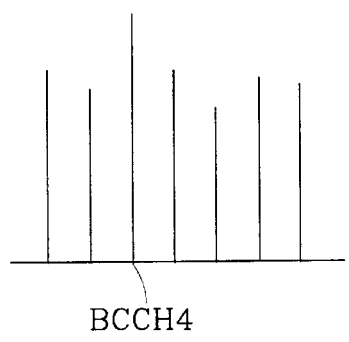
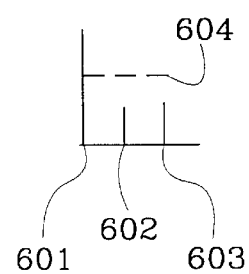
Fig. 5C          Fig. 5D          Fig. 6
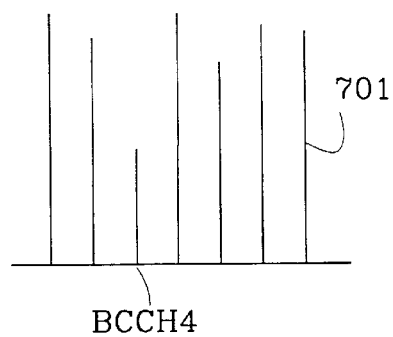
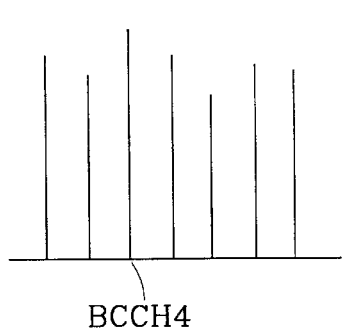
Fig. 7A          Fig. 7B

APPARATUS AND METHOD IN A COMMUNICATION NETWORK

TECHNICAL FIELD

The present invention relates to a method and a mobile station for use in a communications network of GSM type, or of a type derived from GSM. The invention enables a faster handover from one cell to another.

STATE OF THE ART

In a GSM network (Global System for Mobile Communications) it is important that a mobile station for which a call has been established that is carried by a bi-directional (radio)communications channel in an active cell, is not disconnected when the mobile station moves to another cell. In order to maintain the call in the other cell, a change of communications channels must be made, to a communications channel in the other cell. The function of changing communications channels during an ongoing call is called handover.

The decision to initiate a handover is made in the GSM network based on, among other things, measurement data reported from the mobile station. The mobile station measures the signal strengths of so called BCCH carriers transmitted from base stations serving cells in the vicinity of the active cell. Average values for the signal strengths are formed for each of said BCCH carriers during a measuring period, and the signal strength average values of the six strongest BCCH carriers are reported to the GSM network. Before the mobile station can report the signal strength for a certain BCCH carrier, the mobile station must identify this BCCH carrier. The identification of the BCCH carrier is initiated after the carrier has been found to be one of the six strongest BCCH carriers in a comparison of the signal strength average values obtained during one measuring period. The identification of the BCCH carrier takes approximately one or a few seconds, this time interval causing a corresponding delay from the time when the signal strength of the BCCH carrier is found to be interesting to report, until the time when the mobile station can report the signal strength of the BCCH carrier.

British Patent Specification GB 2,225,196 describes a cellular radio system in which a serving base station can reserve channels in the surrounding cells. At handover to a base station in one of the surrounding cells, a reserved channel can be used, which reduces the time from the handover decision until the handover has been completed.

American Patent Specification U.S. Pat. No. 5,379,446 discloses a cellular radio system. A mobile station measures the signal strengths received from the base station in the active cell and from base stations in surrounding cells. The mobile station is provided with means that, for each of the received signals forms signal strength average values over a long and a short time period. In the mobile station the two signal strength average values for the serving base station are compared to the corresponding signal strength for the base stations in the surrounding cells. The mobile station initiates a handover to a surrounding cell when the received signal strength from the base station in said cell is higher than the received signal strength from the serving base station by a certain value called the hysteresis margin. When comparing the signal strength average values over the short time period, a relatively large hysteresis margin is applied compared to the hysteresis margin applied when comparing the signal strength average values over the long time period.

SUMMARY OF THE INVENTION

The present invention attacks the problem of reducing the delay from the time when a mobile station finds the signal strength average value for a BCCH carrier to be interesting to report to the network until the mobile station has identified the BCCH carrier and is able to report the signal strength average value.

The object of the present invention is thus to enable the mobile station to report measurement data for a cell in the vicinity of the active cell faster.

The problem is solved in general terms by a method in which the mobile station initiates the identification of a received BCCH carrier when it is predicted in the mobile station that the BCCH carrier will probably soon be among the strongest BCCH carriers. The invention relates both to said method and to a mobile station having the necessary means to implement the method.

In somewhat more detail the problem is solved according to the following: A communication channel is allocated for communication between a mobile station and a first base station. The mobile station measures signal strengths for BCCH carriers received from base stations in the vicinity of the first base station and form average values for these signal strengths over each of a number of subsequent measuring periods. The mobile station communicates the signal strength average values for the strongest of the BCCH carriers whose identities have been established. The mobile station initiates the identification of a received BCCH carrier when it is predicted, according to a predetermined rule, that this carrier is soon to be one of the strongest BCCH carriers, when the signal strength average values are considered during one of the measuring periods.

One advantage of the invention is that the delay from the point in time when a BCCH carrier has become one of the strongest BCCH carriers, when taking into account the signal strength average values, until the BCCH carrier has been identified, may in many cases be reduced and in some cases eliminated. Consequently the mobile station is able to report measurement data for the BCCH carrier faster, allowing handover to the corresponding cell to be made faster. Because the handover can be made faster, the chances of maintaining an established call in situations when the radio conditions are changing fast are improved. Examples of such situations are turning a corner in a sky scraper area or entering an underground railway station.

The invention will now be described in more detail by means of preferred embodiments and with reference to the appended drawings.

BRIEF DESCRIPTION OF THE DRAWINGS

FIGS. 5A–5D are bar charts showing signal strength average values for a set of BCCH carriers over each of the subintervals in FIG. 4.

FIG. 6 is a bar chart illustrating the growth in the signal strength average value for a BCCH carrier.

FIGS. 7A and 7B are bar charts showing signal strength average values for a set of BCCH carriers over each of the measuring periods shown in FIG. 4.

DETAILED DESCRIPTION OF EMBODIMENTS

Figure 1A:
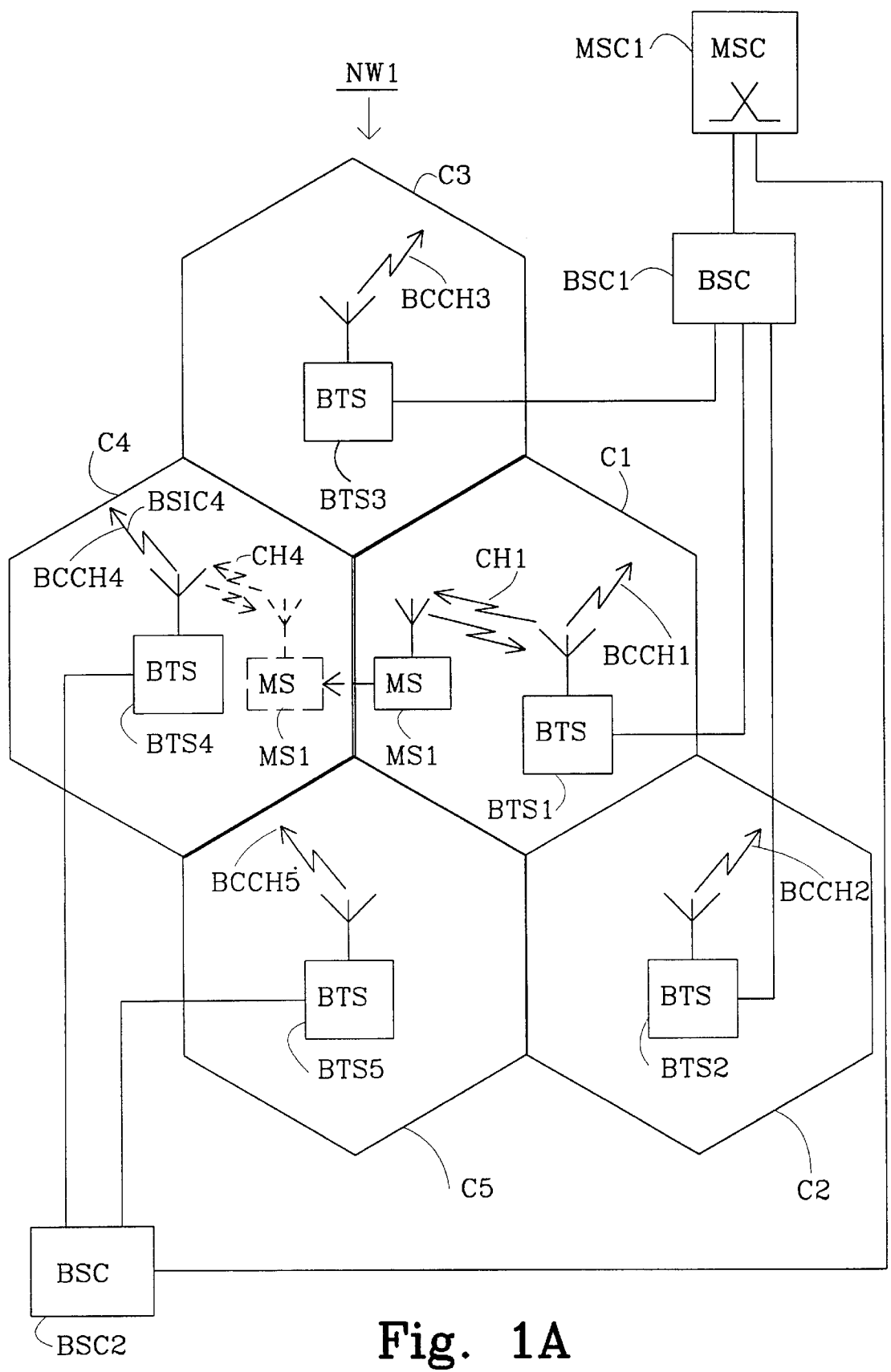
FIGS. 1A and 1B are views of parts of a GSM network.

FIG. 1A shows a part of a GSM network NW1 and a subset of the different types of units found in such a network NW1. The geographical area covered by the network is divided into cells C1–C5. Each cell provides radio coverage in a certain area and has assigned to it a set of frequencies for communication in that area. Each cell C1–C5 is served by a base transceiver station BTS1–BTS5 having means to communicate, by radio, with a mobile station MS1 currently located in the cell. The cell C1 in which the mobile station MS1 is found is called the serving cell and the corresponding base station BTS1 is called the serving base station. The mobile station MS1 comprises means for communicating with the base stations BTS1–BTS5 in the network NW1 and is used by a subscriber to get access to the communication services offered by the GSM network NW1. A group of base stations BTS1–BTS3 is controlled by a base station controller BSC1. A number of base station controllers BSC1–BSC2 are controlled by an exchange MSC1 known as a Mobile Services Switching Centre MSC. The exchange MSC1 is responsible for connecting calls to and from mobile stations MS1 in the area served by the exchange MSC1.

When a call is established to or from the mobile station MS1, a communication channel CH1 is allocated for radio communication between the mobile station MS1 and the serving base station BTS1. If the mobile station MS1 moves into a second cell C4 during the call, a new communication channel CH4 in this second cell C4 must be allocated in order for the call not to be disconnected. The function of changing communication channels during an established call is called handover. The decision to initiate a handover is made by the base station controller BSC1 controlling the serving base station BTS1.

Before the base station controller BSC1 can make a decision about handover, the mobile station MS1 must first report what cells are suitable candidates for handover. The mobile station measures the signal strengths of so called BCCH carriers BCCH2–BCCH5 transmitted by the base stations BTS2–BTS5 in the surrounding cells C2–C5. For each of the BCCH carriers BCCH2–BCCH5 a signal strength average value is formed over a measuring period and the average values of the strongest BCCH carriers are reported to the base station controller BSC1. Before the mobile station MS1 can report the signal strength of a certain BCCH carrier BCCH4, the mobile station MS1 must, according to GSM specifications, identify the BCCH carrier BCCH4. This is done by the mobile station reading identity information BSIC4 carried by the BCCH carrier BCCH4.

Figures 2, 4:
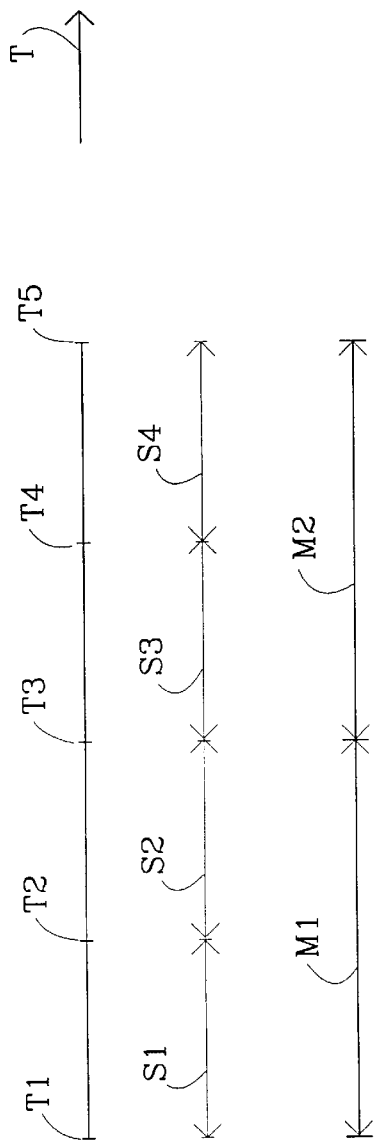
FIG. 2 is a block diagram of a 51 multiframe.
FIG. 4 is a time diagram illustrating the division of time into measuring periods and subintervals.

FIG. 2 shows how time slot zero of the BCCH carrier BCCH4 is used for carrying various logical channels. The figure shows how Time Division Multiple Access (TDMA) frames in a 51 multiframe 200 are used for carrying the logical channels. The logical channels comprise a frequency correction control channel (FCCH) 201 and a synchronization channel (SCH) 202. The frequency correction channel 201 carries information for the frequency correction of the mobile station MS1. The synchronization channel 202 carries information for the synchronization of the mobile station MS1 and the above mentioned identity information BSIC4 in the form of a base station identity code (BSIC). In addition to the frequency correction control channel 201 and the synchronization channel 202 the 51 multiframe 200 also comprises the logical channels Common Control Channel (CCCH) and Broadcast Control Channel BCCH. Further detail on the channel structure of GSM is available in the GSM specifications GSM 05.01 and GSM 05.02.

In order for the mobile station MS1 to be able to determine the identity of the carrier, that is, BSIC, it must detect and decode first the frequency correction control channel 201 and then the synchronization channel 202. Determining the identity of the BCCH carrier BCCH4 may take up to a couple of seconds.

In the messages used to report suitable handover candidates there is room to report measurement data for up to six BCCH carriers.

An ordinary mobile station reports measurement data for the six strongest BCCH carriers with a known BSIC.

For a multiband mobile station a parameter called multiband reporting is used for determining the BCCH carriers for which measurement data is to be reported. The selection criterion may then be modified so that the selection, in addition to the signal strength average values also takes into account the frequency band to which each BCCH carrier belongs.

Further details of the reporting of measurement data from a mobile station are available in the GSM specification GSM 05.08.

In order to simplify the description, in the following the invention will be described with the assumption that it is applied in mobile stations of ordinary type, in which measurement data for the six strongest BCCH carriers with known BSIC are reported by the mobile station. It will be obvious to the skilled person how to adapt the invention for use in a multiple band mobile station applying another selection criterion.

In prior art mobile stations the identification of an unidentified BCCH carrier is initiated after this BCCH carrier is among the strongest BCCH carriers in a comparison of the signal strength average values during a measuring period. Because the mobile station must identify the BCCH carrier before it is possible to report measurement data for the BCCH carrier to the base station controller, this causes a delay from the point in time when the BCCH carrier is among the strongest BCCH carriers, so that it is desirable to report measurement data for the BCCH carrier, until the mobile station can report measurement data for the BCCH carrier to the base station controller.

In some situations, for example when the mobile station user turns a corner in a sky scraper area or enters an underground railway station, the radio communications conditions are changed very fast. In these situations the radio connection to the serving base station deteriorates very fast while the signal strength of a new base station may grow very fast. In order to maintain an established call in such situations it is very important to be able to make a handover to the new base station fast. As the previously mentioned delay contributes to delaying the handover it is desirable to reduce said delay.

The basic idea of the invention is not to wait until the BCCH carrier is among the strongest BCCH carriers, with regard to the signal strength average values over a measuring period, before initiating the identification of a BCCH carrier. Instead, the identification of the BCCH carrier is initiated when it is predicted, based on the measured signal strengths, that it will soon be one of the strongest BCCH carriers with regard to the signal strength average values over a measuring period. Thus, the identification of the BCCH carrier is made while its signal strength average value is growing, enabling the delay to be reduced and, in some cases, eliminated.

Figure 3A:
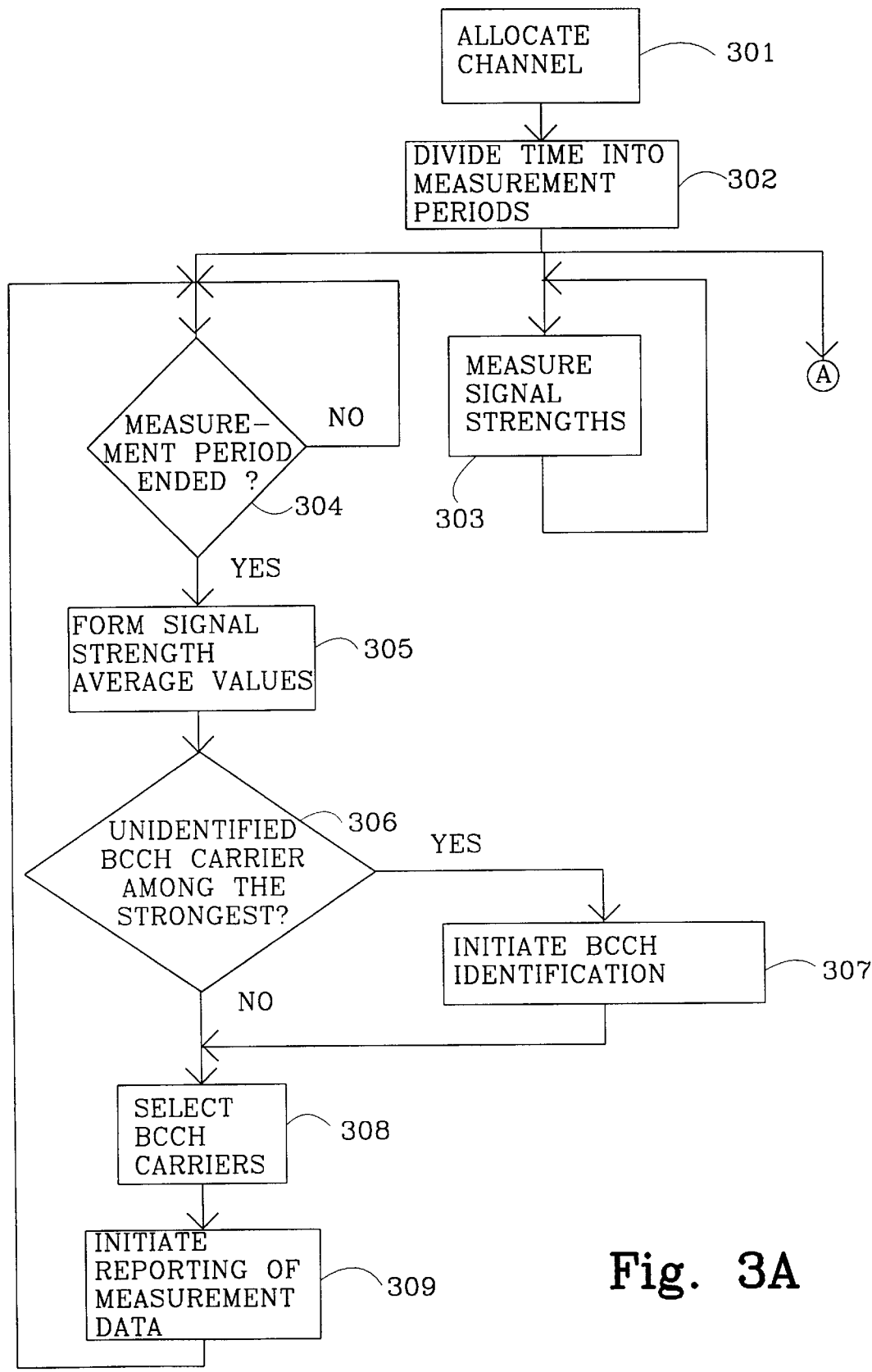
FIG. 3A is a flow chart corresponding to method steps known in the art.
Figure 3B:
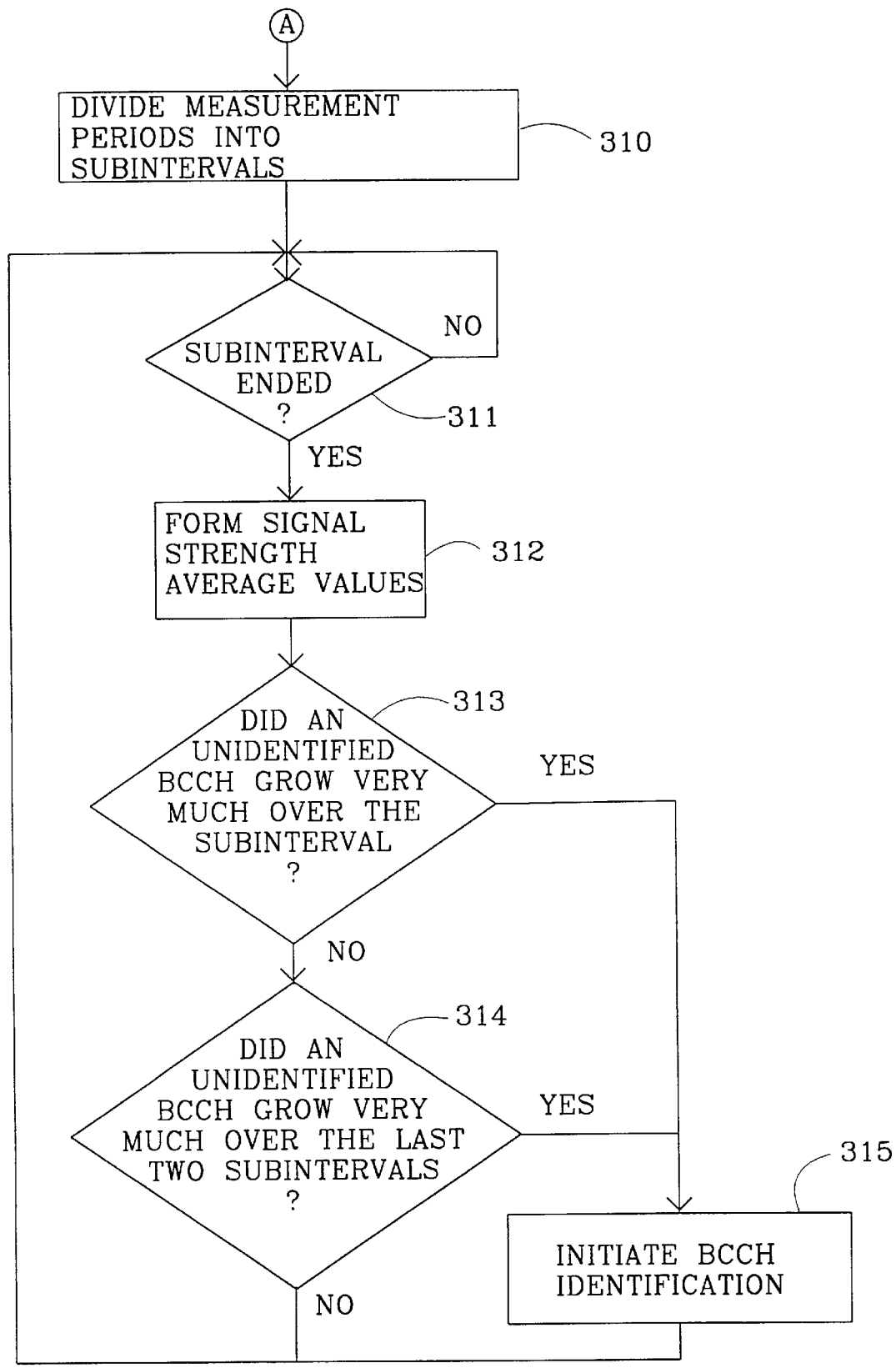
FIG. 3B is a flow chart that, together with FIG. 3A, illustrates a first embodiment of a method according to the invention.

FIGS. 3A and 3B are flow charts of a first embodiment of a method according to the invention.

FIG. 3A shows, in step 301, how a communication channel is allocated for communication between a first base station and a mobile station. In GSM terminology the communication channel is made up of a physical channel carrying two logical channels: a traffic channel TCH and a slow associated control channel SACCH. The traffic channel is used for the transfer of user information such as speech or data, whereas the associated control channel is used, among other things, for the above mentioned reporting of signal strength average values of BCCH carriers. See GSM 05.01 and GSM 05.02 for further detail.

In connection with the allocation of the communication channel, in step 302 the time is divided into subsequent measuring periods, the length of which corresponds to an SACCH multiframe. In this case the SACCH multiframe is comprised of 104 TDMA frames, corresponding to a duration of 480 milliseconds.

After step 302 the flow chart branches into parallel branches. This is to be interpreted in the way that the method steps of each of the branches are to be carried out simultaneously with the method steps of the other branches.

In step 303 the mobile station measures the signal strengths of each of the BCCH carriers comprised in a BCCH Allocation (BA) list received from the first base station. The network operator determines which BCCH carriers are to be on the BA list. Sometimes the BA list is specified to include the BCCH carrier in the active cell, causing the mobile station to perform measurements and report measurement data for this BCCH carrier as well. The BCCH carriers are measured in sequence one by one, and when the sequence has been completed a new one is started. The measurements are carried out between a transmission time slot and the following reception time slot belonging to the allocated communication channel.

Step 304 prescribes waiting until a measuring period has been completed.

In step 305 the measurement values obtained in step 303 during the measuring period are used to form a signal strength average value for each of the BCCH carriers over the completed measuring period.

In step 306 it is checked whether or not any of the six strongest BCCH carriers is unidentified. If this is the case (result YES), in step 307 an identification of the unidentified BCCH carrier is initiated.

After step 307, or if no unidentified BCCH carrier was found in step 306 to be among the six strongest BCCH carriers (result NO), in step 308 the BCCH carriers for which signal strength average values are to be reported are selected. The signal strength average values of the (up to) six strongest BCCH carriers for which the BSIC is known are then reported.

In step 309 the communication of the signal strength average value over the completed measuring period and the BSIC for each of the selected BCCH carriers to the first base station is initiated. This information is transferred on the slow associated control channel during the next measuring period. If the control channel is needed during the next measuring period for transferring other information, this measurement data is not communicated. Measurement data is, however, always reported for at least every second measuring period.

After step 309 the procedure returns to step 304, waiting for the next measuring period to come to an end.

The method steps 301–309 shown in FIG. 3A correspond to what happens in a prior art mobile station. FIG. 3B illustrates the method steps 310–315 that are new according to the invention.

In step 310 a division of each measuring period into a number of subintervals is made.

Step 311 prescribes waiting until a subinterval has come to an end.

In step 312 the measurement values obtained in step 303 during the subinterval are used to form, for each of the unidentified BCCH carriers, a signal strength average value over the completed subinterval.

In step 313, for each of the unidentified BCCH carriers the signal strength average value over the subinterval is compared to the signal strength average value over the immediately preceding subinterval. If the signal strength average value for any of the BCCH carriers has grown by a value larger than a first predetermined threshold value (result YES), it is predicted that this BCCH carrier will probably soon be one of the six strongest BCCH carriers considering the signal strength average value over a measuring period.

If in step 313 no unidentified BCCH carrier was found to have an increase in signal strength average value larger than the first threshold value (result NO), in step 314, for each of the unidentified BCCH carriers the signal strength average value over the subinterval is compared to the signal strength average value over the subinterval two subintervals earlier. If the signal strength average value of any of the BCCH carriers has increased by a value larger than a second predetermined threshold value (result YES), it is predicted that this BCCH carrier will probably soon be one of the six strongest BCCH carriers considering the signal strength average value over a measuring period.

The first threshold value is selected so that in the comparison in step 313 a BCCH carrier is pointed out if it has grown very much in signal strength over the last subinterval. The second threshold value is set in such a way that in the comparison in step 314 a BCCH carrier is pointed out if it has grown very much in signal strength during the two last subintervals but not quite fast enough to have been pointed out during any of the two latest subintervals in step 313.

When selecting the threshold values it is important to take into account the effects of fast fading in order to minimize the risk of erroneously pointing out an unidentified BCCH carrier.

If in step 313 or 314 a BCCH carrier has been pointed out as probably soon to be one of the six strongest BCCH carriers measured over a measuring period, probably the measurement data of the BCCH carrier that was pointed out will be due for reporting. In step 315 therefore, the identification of the BCCH carrier is initiated.

If in step 313 or step 314, respectively, more than one BCCH carriers are found to have grown in signal strength average value faster than the first or the second threshold value, respectively, in step 315 an identification of the BCCH carriers having the fastest growing signal strength is initiated.

After step 315, or if no unidentified BCCH carrier has been pointed out in the comparison in step 314 (result NO), the procedure returns to step 311 and waits for the next subinterval to come to an end. The method steps 303, 304–309 and 310–314 are repeated until the allocated channel is released.

In the inventive method described above, the identification of an unidentified BCCH carrier is initiated not only when it is predicted that the BCCH carrier will probably soon be one of the strongest BCCH carriers (step 315); the identification of an unidentified BCCH carrier found to be one of the strongest BCCH carriers over a measuring period is also initiated in the way known in the art (step 307).

It is assumed that the inventive method described in connection with FIGS. 3A and 3B is implemented in the network NW1 shown in FIGS. 1A and 1B. The method steps shown in FIGS. 3A and 3B, except step 301, are fully implemented in the mobile station MS1. Step 301 is carried out in co-operation with other units in the network NW1.

Figure 1B:
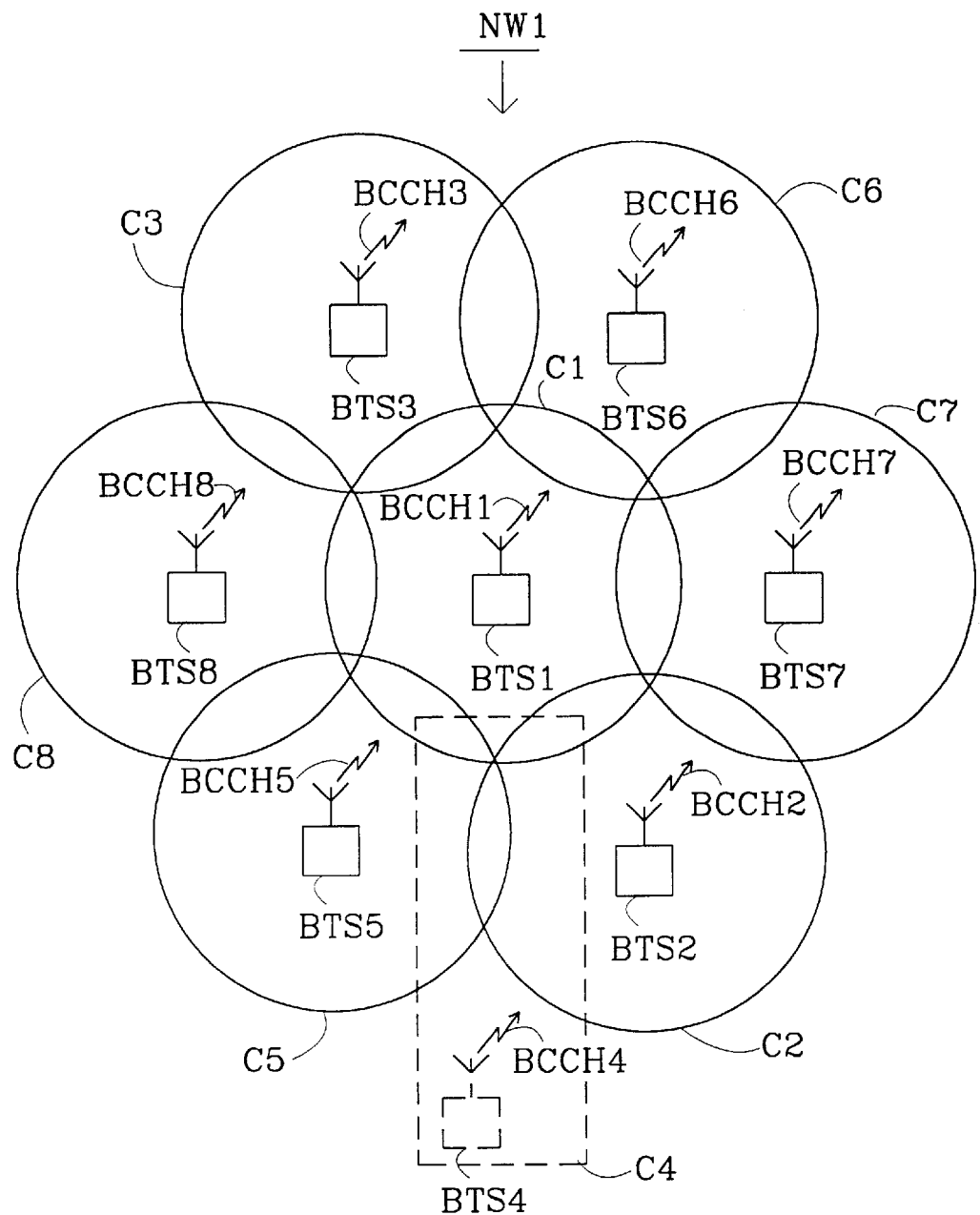

FIG. 1B shows that the network NW1 comprises three cells C6–C8 in addition to the cells C1–C5 shown in FIG. 1A. The cells C6–C8 are served by base transceiver stations BTS6–BTS8, each transmitting a BCCH carrier BCCH6–BCCH8. FIG. 1B also shows the mutual location of the cells in more detail. The cell C4, delimited by dashes, provides radio coverage in an underground railway station. A call is established when the mobile station MS1 is located in the cell C1, and the mobile station MS1 then moves to the cell C4.

FIG. 4 shows how, in the mobile station MS1 the time T after the allocation of the communication channel CH1 is divided into measuring periods and subintervals. FIG. 4 shows two subsequent measuring periods M1–M2 each of which has been divided into two subintervals S1–S2, S3–S4. The subintervals S1–S4 are of equal lengths, each corresponding to half a measuring period.

A number of points in time T1–T5 are shown along the time axis T and mark the beginning and the end of each of the subintervals S1–S4. The points in time for which the reference is an odd number, T1, T3, T5 also mark the beginning and the end of the measuring periods M1–M2. The points in time for which the reference is an even number, T2, T4, mark the central points of the measuring periods M1–M2.

As mentioned above the mobile station MS1 measures the signal strengths of each of the BCCH carriers on the BA list received from the serving base station BTS1. In this example it is assumed that the BA list comprises the BCCH carriers BCCH2–BCCH8 shown in FIG. 1B.

The obtained measurement values are used for forming signal strength average values both over each of the subintervals S1–S4 and over each of the measuring periods M1–M2.

FIGS. 5A–5D show the variation of the signal strength average values over the subintervals S1–S4. FIG. 5A is a bar chart showing the signal strength average values 501 determined by the mobile station MS1 over the subinterval S1 for each of the BCCH carriers BCCH2–BCCH8 on the BA list. It is assumed that the six strongest BCCH carriers BCCH2–BCCH3, BCCH5–BCCH8 over the subinterval were also the six strongest BCCH carriers over the previous measuring period and that the mobile station MS1 during the current measuring period M1 reports measurement data for these BCCH carriers to the base station controller BSC1 through the serving base station BTS1. FIGS. 5B–5D show corresponding information for each of the subintervals S2–S4 (the order of the bars being the same as in FIG. 5A). In FIGS. 5A–5D it is seen how the signal strength average value grows for the weakest BCCH carrier BCCH4 of FIG. 5A, while decreasing for the other BCCH carriers. The growth in signal strength is particularly strong in subinterval S2, corresponding to the change between FIGS. 5A and 5B.

At the point in time T3 in FIG. 4, that is, when the subinterval S2 has been completed, a comparison is made for the unidentified BCCH carrier BCCH4 between the signal strength average value in subinterval S2 and the signal strength average value in the immediately preceding subinterval S1 (step 313 in FIG. 3B). The difference in the signal strength average values is shown by the first bar 601 in FIG. 6. The result of a corresponding comparison of the signal strength average values over the intervals S3 and S2, made at the point in time T4, is shown by the second bar 602. The result of the comparison at the point in time T5 of the signal strength average values in the subintervals S4 and S3 is shown by the third bar 603. The first threshold value 604 is shown by a dashed line. From FIG. 6 it can therefore be seen that the growth in signal strength average values between the intervals S1 and S2, represented by the first bar 601, exceeds the first threshold value 604. The mobile station MS1 will therefore initiate the identification of the unidentified BCCH carrier BCCH4 at the point in time T3 in FIG. 4.

FIGS. 7A and 7B show the signal strength average values after the measuring periods M1 and M2, respectively. From FIG. 7A it may be seen that the unidentified BCCH carrier BCCH4 is not among the six strongest BCCH carriers in a comparison of the signal strength average values 701 over the measuring period M1. FIG. 7B shows that the above mentioned BCCH carrier BCCH4 is among the six strongest BCCH carriers in a comparison of the signal strength average values over the measuring period M2. Thus, a prior art mobile station would initiate the identification of the BCCH carrier BCCH4 after the measuring period M2 had come to an end, that is, at the point in time T5. This should be compared to the inventive mobile station MS1 which, according to the above, initiates the identification of the BCCH carrier BCCH4 at the point in time T3.

It should be noted that FIGS. 5A–5D, 6 and 7A–7B are only intended to illustrate the inventive principle and should not be taken to show actual values of signal strength levels and the first threshold value.

The inventive mobile station MS1 comprises:

communication means for communication with the serving base station BTS1 on the allocated communication channel CH1;

measuring means for measuring the signal strengths of BCCH carriers BCCH2–BCCH8 transmitted by the base stations in the vicinity of the serving base station;

a first averaging means for forming the signal strength average values 701 of the BCCH carriers BCCH2–BCCH8 in each of said measuring periods M1–M2;

a second averaging means for forming the signal strength average values 501 for the signal strengths measured for the BCCH carriers BCCH2–BCCH8 in said subintervals S1–S4 of the measuring periods M1–M2;

means for pointing out, in the manner described above, an unidentified BCCH carrier (in the disclosed example, BCCH4) that will probably soon be one of the strongest BCCH carriers, considering the signal strength average values in one of the measuring periods;

identification means for the identification of an unidentified BCCH carrier, for example the unidentified BCCH carrier BCCH4 that has been pointed out.

measurement data reporting means for reporting, when one of the measuring periods has been completed, the signal strength average values during the measuring period for the six strongest BCCH carriers, to the serving base station BTS1.

A more detailed description of the mobile station MS1 will be given below in connection with FIGS. 8–10.

Figure 8:
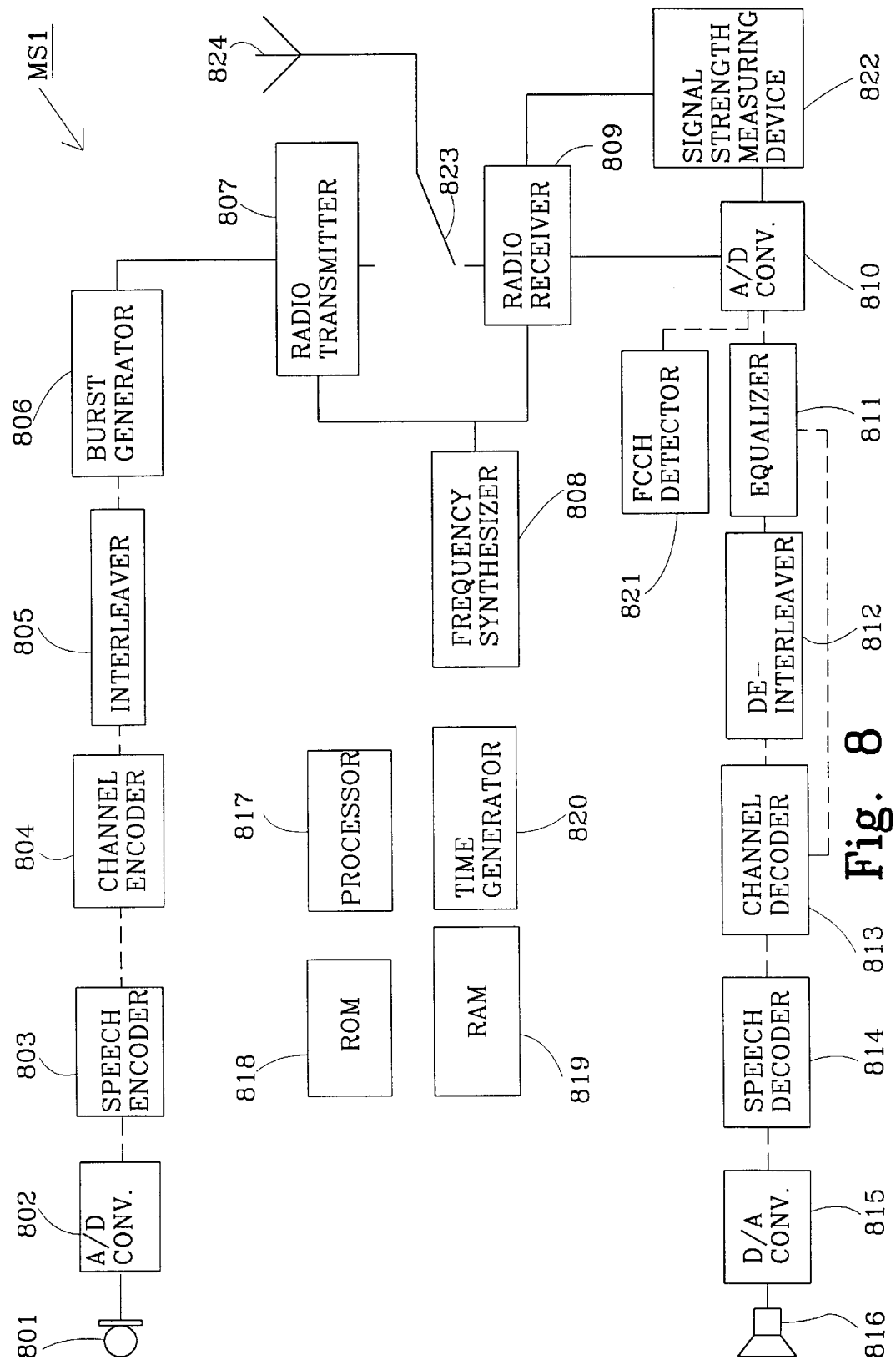
FIG. 8 is a hardware block diagram of an inventive mobile station.

FIG. 8 is a hardware block diagram of the mobile station MS1. The mobile station MS1 comprises a microphone 801 converting recorded sound to an analogue electric signal. An analogue to digital (A/D) converter 802 converts the analogue signal from the microphone 801 to digital information. A speech encoder 803 compresses the data flow out from the A/D converter 802. After the speech encoder 803 there is a channel encoder 804 which introduces information for detecting and correcting signal errors introduced when communicating on the communication channel CH1, into the data flow. An interleaver 805 takes the encoded words received from the channel encoder 804 and distributes the information of each encoded word to a number of information bursts. A burst generator 806 retrieves output data from the interleaver 805 to be sent in a burst and uses this information to form a corresponding analogue base band signal.

A radio transmitter 807 converts the base band signal from the burst generator 806 to a radio signal by modulating a carrier the frequency of which is determined by a frequency synthesizer 808. The radio transmitter 807 amplifies the modulated radio signal to a suitable power level.

The mobile station also comprises a radio receiver 809 receiving radio signals the frequency of which is determined by the frequency synthesizer 808. The radio receiver 809 converts the received radio signals to an analogue base band signal. The output signal from the radio receiver 809 is sampled by a second A/D converter 810. The output data from the second A/D converter 810 is processed by an equalizer 811 to compensate for any time dispersion that has been introduced. A de-interleaver 812 receives the output data from the equalizer 811 and gathers information from a number of bursts and forms encoded words from this information. A channel decoder 813 performs error detection and error correction on the output data from the de-interleaver 812. A speech decoder 814 expands the output data from the channel decoder 813. A D/A converter 815 converts the output data from the speech decoder to an analogue signal used by an earphone 816 to generate sound.

Depending on whether transmission or reception is to take place at a certain point in time, a switch 823 connects either the radio transmitter 807 or the radio receiver 809 to an antenna 824.

The mobile station MS1 further comprises a processor, or Central Processing Unit (CPU) 817, executing program instructions stored in a Read Only Memory (ROM) 818. The processor 817 has the overall responsibility for the operation of the mobile station MS1 and controls the other units in accordance with the program instructions. The result, in the form of digital data created by the units, is exchanged through a Random Access Memory (RAM) 819. For example, the output data from the speech encoder 803 is stored in the RAM 819 and the channel encoder 804 retrieves this data from the RAM 819.

A timing generator 820 is used as a time reference in the mobile station.

The mobile station MS1 comprises both a data bus for the exchange of data between the units and memories 818, 819 and a control bus through which the processor 817 can control the units. The two buses are not shown in FIG. 8. As mentioned above, the exchange of data between the units is made by storing data in, and retrieving data from, the RAM 819. The logical flow of data between different units is illustrated with dashed lines in FIG. 8.

Control information, such as measurement data reports from the mobile station or the BA list, is transferred between the mobile station MS1 and the serving base station BTS1 in signalling messages. This information is given from the processor 817 to the channel encoder 804, respectively is received by the processor 817 from the channel decoder 813. Apart from that, the description above corresponds to what occurs at transmission and reception of information also in this case.

When the mobile station MS1 is to measure the signal strength of a BCCH carrier, the frequency synthesizer 808 is tuned to the frequency of the BCCH carrier BCCH4. The radio receiver 809 then receives the BCCH carrier BCCH4. The energy received is accumulated in a signal strength measuring device 822 and after a certain period of time the second A/D converter 810 reads the signal strength measuring device 822. The read value is stored in the RAM 819.

When identifying a BCCH carrier BCCH4, first the frequency correction control channel carried by the BCCH carrier BCCH4 and then the synchronization channel are detected and decoded. The detection and decoding of said logical channels are carried out during idle TDMA frames not used for communication with the serving base station BS1 on the allocated communication channel CH1. When detecting the frequency correction control channel the frequency synthesizer 808 is tuned to the frequency of the BCCH carrier BCCH4. The radio receiver 809 is then started and receives data during a whole TDMA frame. The received data is converted to digital form by the second A/D converter 810 and is then processed by an FCCH detector 821. The result from the FCCH detector is stored in the RAM 819. After gathering data during the idle TDMA frame in eleven 26 multiframes, the processor analyses the stored data to determine whether or not a frequency correction burst has been received. If this is the case, the necessary frequency correction will be carried out in the mobile station MS1, before proceeding with the detection and decoding of the synchronization channel. Again, the frequency synthesizer 808 is tuned to the frequency of the BCCH carrier BCCH4, before the radio receiver 809 is started and receives data for the full duration of a TDMA frame. The received data is converted to digital form by the second A/D converter 810. The equalizer 811 processes the output data from the A/D converter 810. The channel decoder 813 searches the output data from the equalizer 811 for a synchronization burst. Output data from the channel decoder 813 indicates whether or not a synchronization burst has been detected and, if that is the case, also comprises the BSIC data mentioned above. For the detection of the synchronization channel it may be necessary to use the idle TDMA frame in up to eleven 26 multiframes.

Unless both a frequency correction burst and a synchronization burst are found, the received radio signal is not a BCCH carrier. In this case the gathered measurement data related to the received radio signal is deleted.

Swedish patent application SE 9602459-1 describes a method in which the time for the actual detection of the frequency correction control channel and the synchronization channel may be reduced compared to the known method of performing these tasks, described above.

Figure 10:
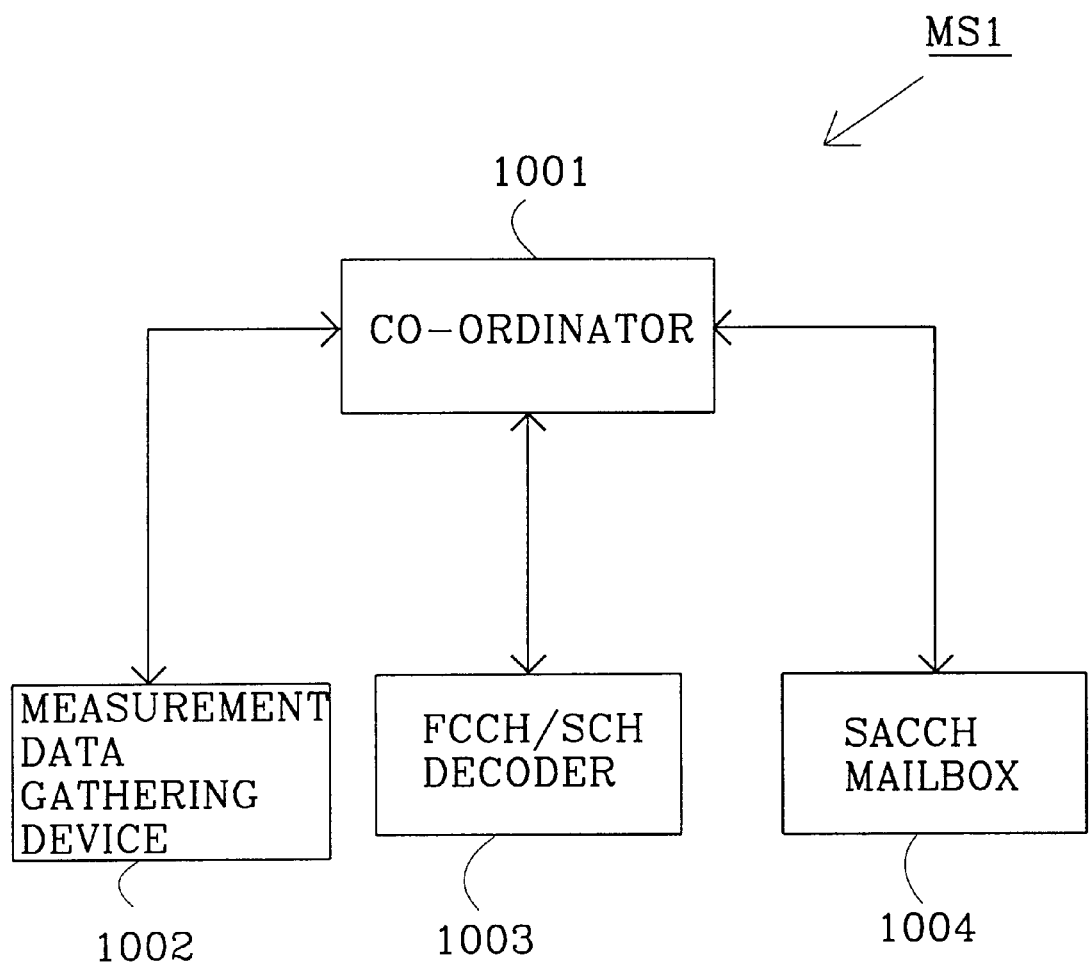
FIG. 10 is a function block diagram of an inventive mobile station.

FIG. 10 is a functional block diagram of the mobile station MS1. It should be noted that only function blocks related to the present invention are illustrated in FIG. 10.

The mobile station MS1 comprises four function blocks: a co-ordinator 1001, a measurement data gathering device 1002, an FCCH/SCH decoder 1003 and an SACCH mailbox 1004. The co-ordinator function block is implemented in software only, whereas the other function blocks comprise both hardware and software.

The measurement data gathering device 1002 performs signal strength measurements on BCCH carriers. The measurement data gathering device receives a signal from the co-ordinator giving an order to carry out signal strength measurements on the BCCH carriers BCCH2–BCCH8. The signal also comprises information about how often the gathered measurement data is to be reported to the co-ordinator, which in this case should be done after each subinterval corresponding to half an SACCH multiframe (240 milliseconds). The measurement data gathering device 1002 measures the signal strengths of the BCCH carriers BCCH2–BCCH8 in turn. For each of the BCCH carriers BCCH2–BCCH8 to be measured by the measuring data gathering device 1002, there are two variables: a signal strength accumulator and a counter. Every time the measurement data gathering device 1002 has measured the signal strength of a BCCH carrier the measured value is added to the signal strength accumulator corresponding to the BCCH carrier, and the counter is incremented by one. When a subinterval has passed, the measurement data gathering device 1002 reports the content of the signal strength accumulators and the counters for each of the BCCH carriers BCCH2–BCCH8 to the co-ordinator 1001. The measurement data gathering device then resets all signal strength accumulators and counters to zero and starts gathering new measurement values.

The FCCH/SCH decoder 1003 identifies the BCCH carriers. When the co-ordinator 1001 has decided that a BCCH carrier is to be identified, a signal is sent to the FCCH/SCH decoder 1003 comprising information about the BCCH carrier to be identified and information about whether the identification should be given a high or a low priority. If the identification of the BCCH carrier BCCH4 wave has been given a low priority, the identification may be interrupted if a request for identification of a second BCCH carrier is received from the co-ordinator before the first identification has been completed. If the identification of the BCCH carrier BCCH4 has been given a high priority, the identification is always completed before the next identification is started. The FCCH/SCH decoder 1003 reads the BSIC data BSIC4 carried by the BCCH carrier BCCH4 in a way known in the art. The FCCH/SCH decoder then passes a signal to the co-ordinator 1001 comprising the identity BSIC4 of the BCCH carrier BCCH4.

The SACCH mailbox 1004 handles the reception and transmission of signalling messages on the corresponding control channel carried by the communication channel CH1.

When a signalling message has been received on the corresponding control channel from the serving base station BTS1, the SACCH mailbox 1004 transmits a signal comprising the content of the received message to the function block, for example, the co-ordinator 1001, that is to handle the information in the message. Examples of signalling messages received from the serving base station BTS1 are so called "system information 5" messages comprising the BA list.

The above mentioned signalling messages comprising measurement data reports from the mobile station MS1 are transmitted on the slow associated control channel. After each measuring period the co-ordinator 1001 sends a signal to the SACCH mailbox comprising data for those of the BCCH carriers whose signal strength average values for the measuring period are to be reported. The SACCH mailbox checks if the slow associated control channel can be used to transmit a so called measurement report message during the next SACCH multiframe. If the control channel is free, the SACCH mailbox compiles and transmits said message during the next SACCH multiframe. If not, the information from the co-ordinator 1001 is deleted. The SACCH mailbox, however, makes sure that at least every second SACCH multiframe is used for transmitting measurement report messages.

The co-ordinator 1001 has the overall responsibility for the function in the mobile station MS1. It gives orders and information to, and receives information from, the other function blocks 1002–1004. After the allocation of the communication channel CH1 the co-ordinator 1001 transmits a signal to the measurement data gathering device 1002 giving orders to measure the signal strengths of the BCCH carriers BCCH2–BCCH8 on the BA list, and to report the measured signal strengths after each subinterval corresponding to half an SACCH multiframe. If a changed BA list is later received from the SACCH mailbox 1004, a new signal is sent to the measurement data gathering device 1002 comprising new information as to what BCCH carriers measurements are to be carried out for.

Figure 9:
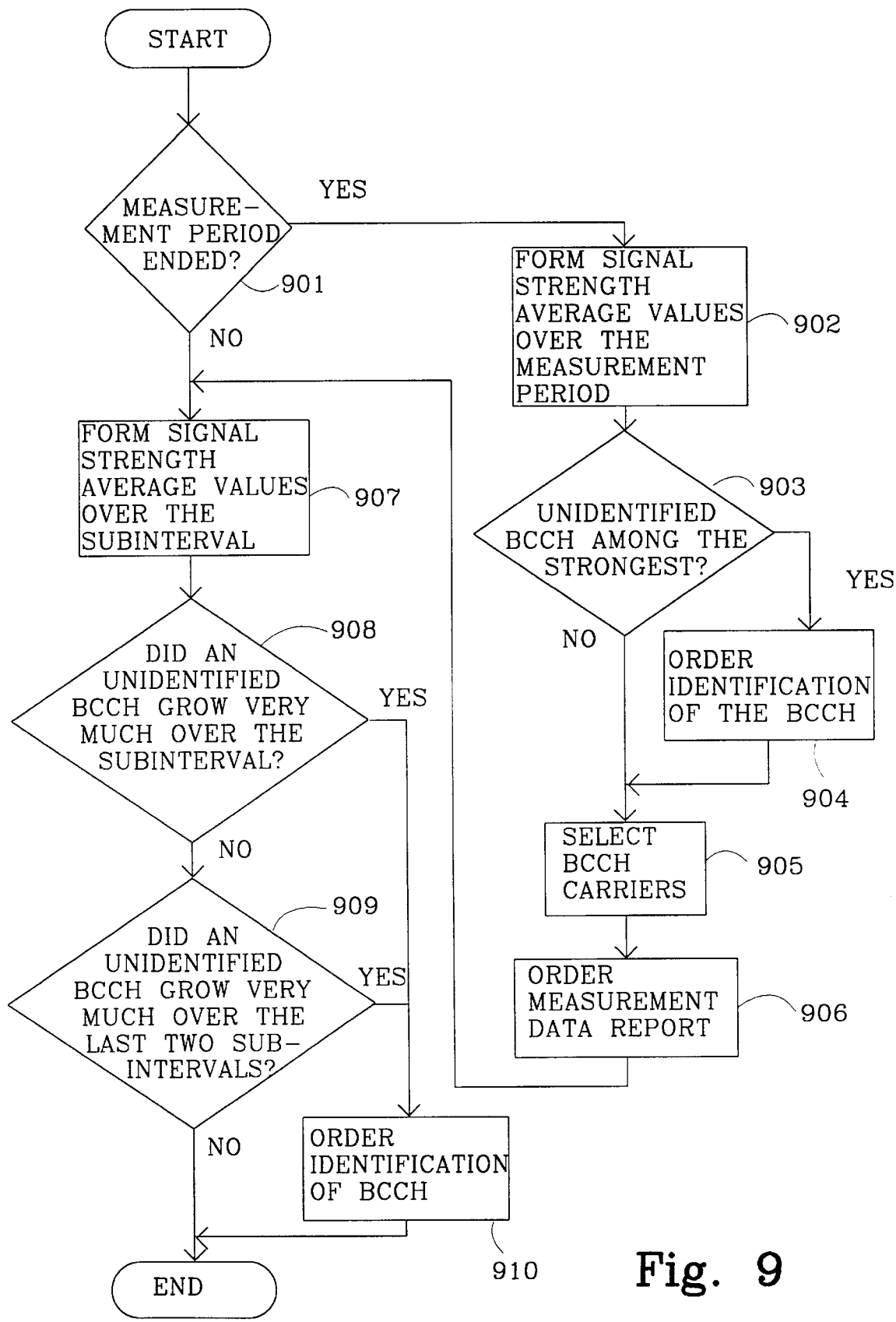
FIG. 9 is a flow chart describing part of the function of the co-ordinator function block in FIG. 10.

When the co-ordinator 1001 receives a measurement data report from the measurement data gathering device 1002 it carries out the steps shown in FIG. 9. In step 901, the co-ordinator first determines whether or not the received measurement data report corresponds to a measuring period having been completed. If that is the case (result YES), the steps 902–906 are carried out. These steps correspond to the steps 305–309 of FIG. 3A and therefore will not be described in more detail, except the steps 904 and 906. In step 904 the co-ordinator 1001 transmits a signal to the FCCH/SCH decoder 1003 giving the order to identity the BCCH carrier pointed out in step 903. In connection with the given order the co-ordinator 1001 indicates to the FCCH/SCH decoder 1003 that the identification of the BCCH carrier has a high priority.

In step 906 the co-ordinator 1001 transmits a signal to the SACCH mailbox 1004 comprising data for those BCCH carriers that were selected in step 905.

After step 906, or if it was found in step 901 that the received measurement data report does not correspond to a measuring period having been completed (result NO), the steps 907–910 are carried out. These steps correspond to the steps 312–315 in FIG. 3A and therefore will not be described in more detail, except step 910. In step 910 the co-ordinator 1001 sends a signal to the FCCH/SCH decoder 1003 giving the order to identify the BCCH carrier pointed out in step 908 or step 909. In connection with the given order the co-ordinator 1001 indicates to the FCCH/SCH decoder 1003 that the identification of the BCCH carrier has a low priority.

When the FCCH/SCH decoder 1003 has identified the BCCH carrier, the co-ordinator receives a signal from the FCCH/SCH decoder comprising the identity, that is, the BSIC data for the BCCH carrier. Even in the case when the FCCH/SCH decoder 1003 has interrupted or failed in the identification a signal is sent to the co-ordinator 1001 comprising information about the event.

There are several different ways of predicting that a BCCH carrier will probably soon be among the BCCH carriers for which measurement data should be reported. Consequently, there are several embodiments of an inventive method, in addition to the method illustrated in FIGS. 3A and 3B. A few additional embodiments of the invention will be described in the following.

The flow chart shown in FIG. 3A (which was described above) and FIG. 3C show an example of a second embodiment of a method according to the invention.

Figure 3C:
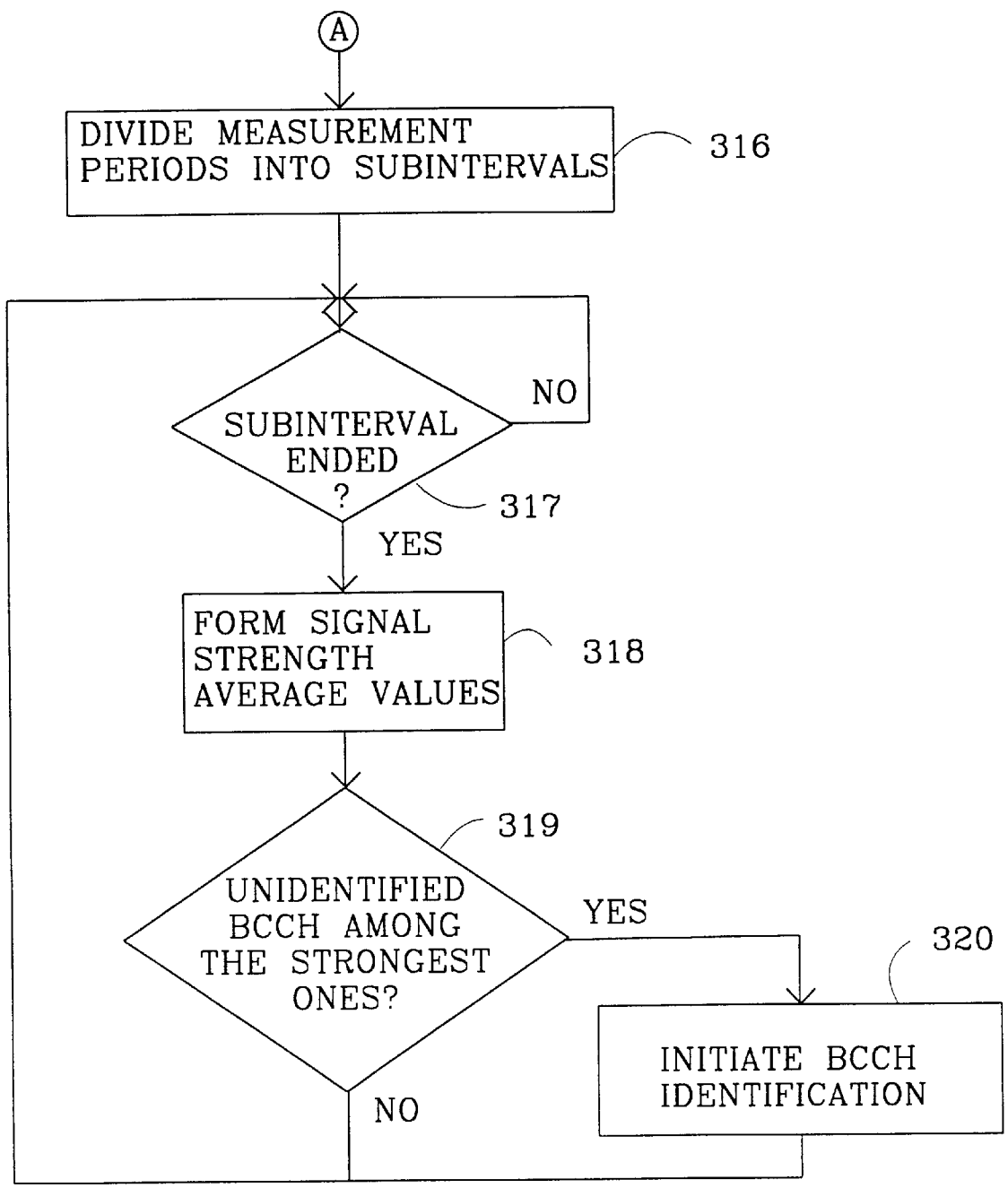
FIG. 3C is a flow chart that, together with FIG. 3A, illustrates a second embodiment of a method according to the invention.

In FIG. 3C the method steps 316–317 and 320 correspond directly to the steps 310–311 and 315 in FIG. 3B and will therefore not be described in more detail in connection with FIG. 3C. The difference in FIG. 3C compared to FIG. 3B consists of the reasons for pointing out an unidentified BCCH carrier for identification. In FIG. 3C, in step 318 signal strength average values are formed over the subinterval for all BCCH carriers. In step 319 the signal strength average values for the BCCH carriers over the last subinterval are then compared to each other. If anyone of the six strongest BCCH carriers is unidentified, it is predicted that this BCCH carrier will probably soon be one of the strongest BCCH carriers when taking into account the signal strength average values over a measuring period, and the BCCH carrier is therefore pointed out for identification (result YES), which is then initiated in step 320. If more than one of the six strongest BCCH carriers are unidentified, the strongest one of these carriers is pointed out. After step 320, or if in step 319 no unidentified BCCH carrier was found among the six strongest ones (result NO), the process returns to step 317 and waits for the next subinterval to be completed.

It is assumed that the inventive method described in connection with FIGS. 3A and 3C is implemented in the network shown in FIGS. 1A and 1B, FIGS. 5A–5D showing, as described above, the variation of the signal strength average values over the subintervals S1–S4 in FIG. 4. FIG. 5 shows that the unidentified BCCH carrier BCCH4 is among the six strongest BCCH carriers over the subinterval S3, causing the mobile station in this case to initiate the identification of the BCCH carrier BCCH4 at the point in time T4 in FIG. 4. This may be compared to a prior art mobile station, which would in such circumstances initiate the identification of the BCCH carrier BCCH4 after the point in time T5 in FIG. 4. (See the discussion above in connection with FIGS. 7A and 7B.)

Figure 3D:
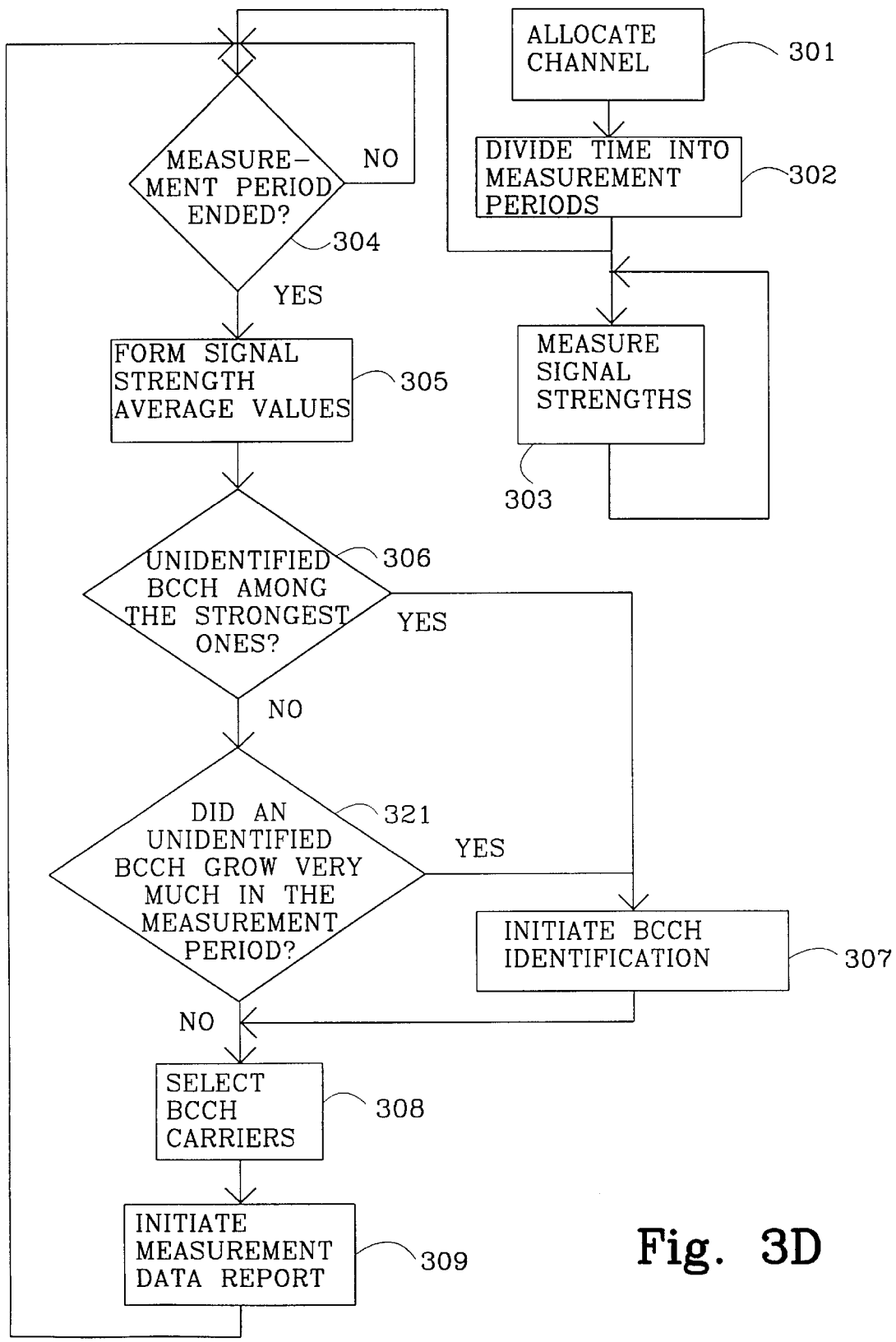
FIG. 3D is a flow chart illustrating a third embodiment of a method according to the invention.

A third embodiment is shown in FIG. 3D. This embodiment is most easily described with FIG. 3A as a starting point. All the method steps 301–309 of FIG. 3A are included. The change that has been made in FIG. 3D compared to FIG. 3A consists in a new step 321 being inserted between step 306 (result NO) and step 308. This means that if, in step 306, no unidentified BCCH carrier was found among the six strongest BCCH carriers (result NO) then step 321 is carried out. In step 321 the signal strength average value over the measuring period is compared, for each of the unidentified BCCH carriers, to the signal strength value over the immediately preceding measuring period. If the signal strength average value for any of the BCCH carriers has increased by a value greater than a predetermined threshold value (result YES), then it is predicted that the BCCH carrier will probably soon be one of the strongest BCCH carriers when taking into account the signal strength average values over a measuring period (result YES), causing the identification of the BCCH carrier to be initiated in Step 307. In the opposite case (result NO), the process proceeds with step 308.

Mobile stations for use in connection with the inventive methods described in connection with FIGS. 3A and 3C, and 3D, respectively, can easily be implemented using the mobile station MS1 described in connection with FIGS. 8–10 as a starting point. Only the function of the co-ordinator in FIG. 10 must be somewhat modified. The modifications to be done are obvious to the skilled person.

The invention is applicable in communication networks of GSM type or of types derived from GSM, including the network types DCS1800 and PCS1900, which is a GSM-based variant of PCS.

What is claimed is:

1. In a network comprising a number of radio base stations and a mobile station for radio communication with the base stations, a method comprising the following steps:

allocating a communication channel for communication between a first one of the base stations and the mobile station;

dividing the time after the allocation of the communication channel into a plurality of measuring periods;

measuring, in the mobile station, signal strengths of broadcast channel (BCCH) carriers transmitted by base stations in the vicinity of the first base station;

forming average values of the signal strengths measured for each of the BCCH carriers during each of the plurality of measuring periods;

communicating, after the completion of one of the plurality of measuring periods, the signal strength average values of the strongest identified BCCH carriers to the first base station;

pointing out, in the mobile station, an unidentified BCCH carrier which, based on the measured signal strengths, is predicted soon to be one of the strongest BCCH carriers, taking into account the signal strength average values over one of the plurality of measuring periods; and initiating, in the mobile station, the identification of the BCCH carrier pointed out, causing identity information carried by said unidentified BCCH carrier to be read by the mobile station.

2. A method according to claim 1, wherein said pointed out BCCH carrier is predicted based on a comparison of how a parameter representing the signal strength of said unidentified BCCH carrier has changed between at least two points in time.

3. A method according to claim 1, wherein said pointed out BCCH carrier is predicted based on a comparison of the average value of the signal strength of said unidentified BCCH carrier over a last one of said plurality of measuring periods with the average value of the signal strength of the unidentified BCCH carrier over an immediately preceding one of said plurality of measuring periods, wherein when the change in the signal strength average value exceeds a predetermined threshold value said unidentified BCCH carrier is predicted to soon be one of the strongest BCCH carriers.

4. A method according to claim 1, further comprising the steps of:

dividing said plurality of measuring periods into subintervals; and forming average values over each of the subintervals for the signal strengths measured for those of said BCCH carriers that are unidentified;

wherein said pointed out BCCH carrier is predicted based on a comparison of the average value of the signal strength of said unidentified BCCH carrier over a last of said subintervals to the average value of the signal strength of the unidentified BCCH carrier over a previous subinterval, wherein when the change in the signal strength average value of the unidentified BCCH carrier exceeds a predetermined threshold value the unidentified BCCH carrier is predicted to soon be one of the strongest BCCH carriers.

5. A method according to claim 1, further comprising the steps of:
   dividing said measuring periods into subintervals;
   forming average values of the signal strengths measured for each of said BCCH carriers over each of the subintervals,
   wherein said pointed out BCCH carrier is predicted based on the unidentified BCCH carrier being found to be one of the strongest BCCH carriers, when comparing the signal strength average values over the last of said subintervals.

6. A mobile station for communication with radio base stations in a network, the mobile station comprising:
   communication means for communication with a first one of said base stations on an allocated communication channel;
   measuring means for measuring signal strengths of broadcast channel(BCCH) carriers transmitted by base stations in the vicinity of the first base station;
   a first averaging means for forming average values of the signal strengths measured for each of the BCCH carriers during each of a sequence of measuring periods;
   identification means for determining the identity of one of said BCCH carriers by reading the identity information carried by the BCCH carrier;
   measurement data reporting means for, upon the completion of one of said measuring periods, communicating to the first base station, by means of said communication means, the signal strength average values of the strongest identified BCCH carriers; and
   means for pointing out an unidentified BCCH carrier which, based on the measured signal strengths is predicted soon to be one of the strongest BCCH carriers taking into account the signal strength average values over one of the measuring periods,
   said identification means being arranged to initiate an identification of the unidentified BCCH carrier that was pointed out.

7. A mobile station according to claim 6, wherein said means for pointing out is arranged to point out said pointed out BCCH carrier based on a comparison of how a parameter representing the signal strength of said unidentified BCCH carrier has changed between at least two points in time.

8. A mobile station according to claim 6, wherein said means for pointing out is arranged to point out said pointed out BCCH carrier based on a comparison of the average value of the signal strength of said unidentified BCCH carrier over a last of said measuring periods with the average value of the signal strength of the unidentified BCCH carrier over an immediately preceding measuring period, said unidentified BCCH carrier being predicted soon to be one of the strongest BCCH carriers if the change in the signal strength average value exceeds a predetermined threshold value.

9. A mobile station according to claim 6, wherein said mobile station further comprises a second averaging means for forming average values over subintervals of said measuring periods for the signal strengths measured for at least those of said BCCH carriers that are unidentified, and
   said means for pointing out is arranged to point out said pointed out BCCH carrier based on a comparison of the average value of the signal strength of said unidentified BCCH carrier over a last of said subintervals with the average value of the signal strength of the unidentified BCCH carrier over a previous subinterval, said unidentified BCCH carrier being predicted soon to be one of the strongest BCCH carriers if the change in the signal strength average value exceeds a predetermined threshold value.

10. A mobile station according to claim 6, wherein said mobile station further comprises a second averaging means for forming averages over subintervals of said measuring periods for the signal strengths measured for said BCCH carriers, and
    wherein said means for pointing out is arranged to point out said pointed out BCCH carrier based on said unidentified BCCH carrier being one of the strongest BCCH carriers in a comparison of the signal strength average values over the last of said subintervals.

11. In a radio communication network, a method for identifying a control channel comprising the steps of:
    measuring a signal strength of each of a plurality of control channels transmitted from a plurality of base stations;
    selecting a number of the control channels with the highest signal strength to be in a first group;
    selecting remaining control channels to be in a second group;
    determining whether a signal strength of a control channel in said second group has increased by a value larger than a first signal strength threshold value during a first time interval; and
    identifying the control channel in the second group if the signal strength of the control channel has increased by a value larger than said first signal strength threshold value during said first time interval.

12. The method of claim 11 further comprising the steps of:
    determining whether a signal strength of a control channel in the second group has increased by a value larger than a second signal strength threshold value during a second time interval, wherein the second time interval includes the first time interval and at least one other time interval; and
    identifying the control channel in the second group if the signal strength of the control channel has increased by a value larger than said second signal strength threshold value during said second time interval.

13. The method of claim 11, wherein the control channel which is identified is predicted to soon be in the first group.

14. The method of claim 11, wherein each of the control channels is a broadcast channel (BCCH) carrier.

15. The method of claim 11, wherein there are six control channels in the first group.

16. The method of claim 11, wherein the signal strength of each of the plurality of control channels is measured over a first measurement period, the method further comprising the steps of:
    forming signal strength average values during the first measurement period for each of the plurality of control channels;
    determining whether any of the control channels in the first group are unidentified;
    identifying any of the unidentified control channels in the first group;
    reporting the signal strength average values and the identity of each of the control channels in the first group.

17. The method of claim 16, wherein said first measurement period includes the first time interval and at least another time interval, the step of determining comprising:
    forming signal strength average values over the first time interval for each of the control channels in the second group.

* * * * *